United States Patent
Chou et al.

(10) Patent No.: US 9,102,560 B2
(45) Date of Patent: Aug. 11, 2015

(54) CHARGING LOAD FOR MAKING TFT GLASS AND METHOD OF MAKING SAME

(71) Applicant: SIBELCO ASIA PTE. LTD., Singapore (SG)

(72) Inventors: Chen Tsung Chou, Taiwan (TW); Claud Eric Westbrook, III, Singapore (SG)

(73) Assignee: SIBELCO ASIA PTE. LTD., Singapore (SG)

( * ) Notice: Subject to any disclaimer, the term of this patent is extended or adjusted under 35 U.S.C. 154(b) by 125 days.

(21) Appl. No.: 14/080,910

(22) Filed: Nov. 15, 2013

(65) Prior Publication Data

US 2014/0199548 A1    Jul. 17, 2014

Related U.S. Application Data

(60) Provisional application No. 61/753,643, filed on Jan. 17, 2013.

(51) Int. Cl.
| | |
|---|---|
| C03C 6/08 | (2006.01) |
| C03B 1/00 | (2006.01) |
| C03C 3/087 | (2006.01) |
| C03C 1/02 | (2006.01) |
| C03B 1/02 | (2006.01) |

(52) U.S. Cl.
CPC ... *C03B 1/00* (2013.01); *C03B 1/02* (2013.01); *C03C 1/026* (2013.01); *C03C 3/087* (2013.01); *Y10T 428/2982* (2015.01)

(58) Field of Classification Search
CPC ............ C03B 1/00; C03B 1/02; C03C 1/026; Y10T 428/2982
See application file for complete search history.

(56) References Cited

U.S. PATENT DOCUMENTS

| | | |
|---|---|---|
| 5,849,055 A | 12/1998 | Arai et al. |
| 7,260,960 B2 | 8/2007 | Carty |
| 7,937,969 B2 | 5/2011 | Carty |
| 8,178,476 B2 | 5/2012 | Xie et al. |
| 2011/0131873 A1 | 6/2011 | Soane et al. |

FOREIGN PATENT DOCUMENTS

| | | |
|---|---|---|
| CN | 103339072 A | 10/2013 |
| WO | 2012/108364 A1 | 8/2012 |

OTHER PUBLICATIONS

Office Action dated Jan. 19, 2015 in corresponding Taiwanese Patent Application No. 102142720.
Translation of Search Report dated Dec. 29, 2014 in corresponding Taiwanese Patent Appliation No. 102142720.
Horiba Scientific, Inc. A Guidebook to Particle Size Analysis, 2012 [online], [retrieved on Apr. 3, 2014]. Retrieved from the Internet <https://www.horiba.com/fileadmin/uploads/Scientific/eMag/PSA/Guidebook/pdf/PSA_Guidebook.pdf>; p. 11.
International Search Report and Written Opinion dated Apr. 29, 2014 in corresponding International Application No. PCT/US2013/76082, filed Dec. 18, 2013.

*Primary Examiner* — Karl Group
(74) *Attorney, Agent, or Firm* — Rankin, Hill & Clark LLP (57) ABSTRACT

A charging load and a method of making the same wherein the charging load includes at least three diverse mineral raw materials in pre-selected percentages, the charging load being transformable into an aluminosilicate glass product by heating to a temperature of at least 1,200° C. and being a mass of structurally stabilized individual beads, where each of the beads is a composite of the at least three diverse mineral raw materials made non-friable by a partial sintering process, each bead of the mass containing a homogeneous mixture of ground and sized particles of the at least three diverse mineral raw materials, where the particles have a controlled maximum particle size of less than 30 microns and are mixed in each of the beads at the pre-selected percentages.

22 Claims, 6 Drawing Sheets

FIG. 9

CHARGING LOAD FOR MAKING TFT GLASS AND METHOD OF MAKING SAME

The present invention relates to the making aluminosilicate glass, such as TFT/LCD glass, a "special glass", and more particularly to a novel charging load for making such special glass. This application claims priority to provisional patent application Ser. No. 61/753,643 filed on Jan. 17, 2013 (Our Reference RVS-36467), which is incorporated by reference herein.

BACKGROUND OF THE INVENTION

Low alkali, high aluminum oxide containing glasses utilized in various display devices, including thin film transistor (TFT) television panels and touch screen devices (smart phones, tablets, etc.), require high energy input during manufacturing for melting and refining due to characteristics of the required finished glass chemistry, such as high viscosity and high melting temperature. Traditional glass batching methods involve dry mixing of the individual components prior to introduction to the furnace. There are some issues and limitations associated with such batching as described in Carty U.S. Pat. No. 7,937,969 and Carty U.S. Pat. No. 7,260,960 that are incorporated by reference herein. Batch segregation within the furnace results in inefficient and incomplete melting.

The problems of conventional glass batching methods are magnified by the chemical composition required for the technical display glass products due to the lower alkali content and higher aluminum oxide content. Thus, it is critical to improve the melting and refining processes in the furnace without changing the chemical composition specified. A possibility of achieving higher efficiency is to alter the form of the glass batch materials, such that the degree of reactivity is increased, and such as increasing the specific surface area of the materials. However, particle sizing of the batch materials is quite limited due to losses and problems caused within the furnace and sizing that is too fine causes many problems and are prone to become airborne during melting. Finer particle sizing for the raw materials also causes more entrained air to be introduced into the furnace, resulting in additional refining for bubble removal from the molten glass.

OVERVIEW

It is an object of this invention to increase the melting efficiency of glass batch raw materials, especially for low alkali, high aluminum oxide glass, by enhancing the reactivity and improving the form of the batch that is fed into the furnace. This invention achieves higher thermal efficiency by milling the components of the batch to a finer particle sizing for greater specific surface area and reactivity. These fine batch components are blended into the proportions as required for the finished glass chemical specifications. The blended fine batch materials are slurried together, well mixed into a homogeneous suspension and spray dried. This process produces small dried beads composed of an agglomeration of various fine particles. These spray dried beads are then sintered in a kiln to achieve structural integrity, such that the beads are not friable with normal handling and mixing as encountered with a glass manufacturing process. One aspect of the invention is the novel sizing of the raw materials so the raw material particles have a maximum particle size D99 less than 30 microns, "fine" particles, and preferably less than 20 microns, which is a common definition of "ultra-fine" powder or particles. The preferred maximum particle size is D99 of 3-20 microns.

These sintered beads are granular homogeneous particles of the glass batch mixture without the fluxing agent, having a low specific surface area due to the granular sizing and the highly round (not angular) shape of the beads. This improved form of the glass batch raw materials promotes greater thermal efficiency in the furnace several ways:

1. The lower surface area minimizes the entrained air introduced into the furnace and hence lowers the amount of refining required due to entrapped gas in the molten glass. Less time in the furnace to achieve acceptable glass quality means less energy required.
2. The spray dried beads are composed of fine individual particles that are more reactive thermally than the conventional sizing of the glass raw materials, improving the initial melting performance and reducing the energy input.
3. The intimate contact of the more refractory batch components (silicon dioxide, aluminum oxide) with the less refractory carbonate components (limestone, dolomite) improves the melting performance of the silica and alumina, as well as minimizing the potential for undesired segregation in the furnace, resulting in incomplete melting and defects in the finished glass.

Preferably, the batch beads are blended with the fluxing agent, such as boric acid, prior to introduction to the furnace and handled in a free-flowing, dust-free manner. Or, as an alternative, the fluxing agent can be introduced into the beads.

STATEMENT OF INVENTION

The present invention relates to an improvement in the manufacturing of high quality glass products, such as Thin Film Transistor (TFT) glass. This improvement involves changing the structure of the charging load used in the melting process, without changing or affecting the capital equipment involved in producing this type of high quality glass.

In accordance with the invention, a new charging load is formulated. This new charging load includes at least three diverse raw materials, such as silica, alumina, dolomite, limestone, etc. with or without the necessary fluxing agent for use in melting the charging load. These raw materials are included in the new charging load in pre-selected percentages. The charging load is transformed into an aluminosilicate glass product by heating to a temperature generally over 1,500° C. The invention is a mass of structurally stabilized individual beads (the term "bead" does not define a technical shape, but a generally rounded body with a generally smooth surface). Each of the beads is a composite of the raw materials necessary for the glass being made. They are made non-friable by a partial sintering process. Each bead of the present invention includes a homogenous mixture of ground and sized particles of each of the three or more diverse mineral raw materials making up the charging load. The particles have a controlled maximum particle size and are mixed in each of the beads in the pre-selected percentages necessary for making the ultimate glass. Consequently, the invention involves the formation of individual beads from the necessary mineral raw materials used in making the special glass of the present invention employing the unique concept of sizing the particles into a fine or ultra-fine particle size. The particles have a controlled maximum particle size. After forming the beads, the beads are partially sintered so that they become stable or stabilized for transporting and handling at the facility for making the glass product. Consequently, the charging load of the present invention merely repackages the existing raw materials into a controllable structure, which structure has discovered advantages, some explained earlier and some to be explained later. The invention is the formation of this new charging load to make high quality glass that is formed into display sheets of the type used in televisions and other thin screen devices.

A primary aspect of the present invention is providing a charging load for making aluminosilicate glass, such as TFT glass. As a broad statement, the mineral raw materials for the glass melt are formed into a slurry in the pre-selected percentages of the ultimate glass product and this slurry is formed into a mass of individual beads which are stabilized by partial sintering. Such charging load has resulted in many advantages in making glass.

After the invention was made, a further aspect of the invention was developed to satisfy the unusual situation where a specific customer desires to use the novel bead concept of the present invention with all of its many advantages; but, also wanted to add a unique, different or even secret mineral raw material to create the final "charging load" at the melting facility. To accommodate this unusual commercial demand, the broad definition of the invention is modified. In this modification, the novel structurally stabilized bead incorporates at 'least three" of the mineral raw materials of the charging load of the final melt. The weight percentages of these "at least three" mineral raw materials are determined by the pre-selected percentages of these raw materials in the charging load of the final melt, as dictated by the specification for the specific aluminosilicate glass product.

Using this modified definition of the invention, a "final" charging load bead like the first definition is created when the "at least three" mineral raw materials of the modified definition is actually "all" of the several mineral raw materials of the "charging load". Thus, by this modified definition, the primary aspect of the invention is employed when a customer desires to add no mineral raw material at the manufacturing site and the beads are the "charging load". Consequently, this modified definition merely facilitates a specific customer demand while still defining the novel bead of the present invention. A still further aspect of the invention relates to the fluxing agent, such as boric acid. The novel bead (whether complying with the primary definition of the bead being the "charging load" or the modified definition of a bead possibly being slightly less than the final charging load) can incorporate the fluxing agent, without effecting the many advantages realized by the structurally stabilized bead with fine or ultrafine raw material powders.

As a summary, "charging load" is all "mineral" raw materials for use in the melting process to make the "special" glass. Normally, the required fluxing agent is added to the charging load at the melting facility. Other materials, in addition to the "charging load", can be added to the charging load by a customer to modify the glass or its melting parameters.

In accordance with an aspect of the invention, the maximum particle size of the raw materials in the charging load is controlled to less than 20 microns and preferably in the D99 range of 3 to 20 microns. By using these ultra-fine particles forming the beads constituting the present invention, the interaction of the melting or fusion process is enhanced and efficient, such that the stabilization of the beads is facilitated. In accordance with another aspect of the invention, the effective diameters of the various beads comprising the charging load of the present invention are generally less than 500 microns and preferably within the range of 50 to 200 microns. In accordance with the further aspect of the invention, the effective diameters of the beads have a controlled maximum value with or without a controlled minimum value.

Other aspects of the present invention involve grinding each of the mineral raw materials used in forming the stabilized beads of the present invention into fine powder. In practice, the particles of the powders have essentially the same maximum particle size. This maximum particle size, as defined above, is less than 30 microns and preferably less than 20 microns. Indeed, it is preferably, if the D99 size is used, in the range is 3 to 20 microns. The charging load constituting the novel beads has a content of more than 10% alumina and preferably in the range of 10% to 25% alumina. Furthermore, the beads have a surface smoothness with a roundness greater than 0.8.

A partial sintering process performed on the beads formed in accordance with the present invention causes the raw materials within the beads to be formed into an amorphous content in the range of 20% to 60%. A sintering temperature is used which is drastically below the temperature used to make the glass and in practice is in the range of 900° C.-1,200° C. for a short time, such as 5-25 minutes.

Even though the primary aspect of the present invention is the novel charging load itself or the novel partial charging load, another aspect of the invention is the method of making such charging load for use in creating a glass product, as defined above. In accordance with this method, the raw materials for forming the glass product are provided and are ground into particles. These ground particles or powders are sized individually or together as a mixture of powder, so each of the raw materials has a controlled D99 maximum particle size of less than 30 microns and preferably less than 20 microns. Preferably, the controlled maximum particle size is in the range of 3-20 microns. The raw material powders are blended into a pre-selected percentage to produce the desired final glass product. In this matter, finely divided, sized raw material particles or powders are mixed in a pre-selected percentage determined by the percentage necessary for making the final product. The blended particles are formed into a mass of individual beads, preferably by a standard spray dryer which is adjusted to form beads with the desired effective diameters. Consequently, each bead contains the raw material powders in the pre-selected percentages; however, such beads as so far described do not yet constitute the present invention. Such beads are not structurally stable and can not be transported and handled effectively. One aspect of the invention is the novel sizing of the raw materials so the raw material particles have a maximum particle size D99 less than 30 microns, "fine" particles, and preferably less than 20 microns or a D99 size in the range of 3-20 micron, which is a common definition of "ultra-fine" powder or particles. Unstable beads would be the antithesis of the present invention. The further operation of stabilizing the beads completes the invention. Stabilizing of the small particle beads involves a partial sintering process performed at a low temperature for a very short time. Thus, the beads are structurally stable for subsequent packing, handling, transporting and mixing. Bead stabilization is a critical aspect of the present invention and allows the beads of the present invention to be used as the charging load for subsequent melting into the desired glass product. Consequently, the invention involves controlling the particle sizes of the various finely divided raw materials and stabilizing the beads formed from such processed raw materials. Combining these two operations is novel and constitutes aspects of the present invention.

As defined above, the method for forming the novel charging load constitutes making a mass of stabilized beads, each of which has the raw material formulation for the final glass and are fine or ultra-fine particle size for distribution and subsequent fusion and melting without the entrainment of bubbles and other adverse concepts in the melting process.

This method involves partial sintering of the beads generally formed by a spray dryer and having the effective diameters, preferably in the general range of 50 to 200 microns, but less that 500 microns. The beads have an amorphous content in the range of 20% to 60%. The blending procedure of the present invention involves making a slurry of the powders formed from very fine particles whereas the bead forming procedure involves a drying process, such as performed by a spray dryer.

The partial sintering is accomplished at a temperature in the general range of 900° C.-1,200° C. for a time in the preferred range of 10 to 20 minutes and a practical range of 5 to 25 minutes. This allows an amorphous phase in the individual stabilized beads to constitute 20% to 60% of the sintered bead mass. Sintering stabilizes the beads into individual bodies that can be transported, processed, handled and formed into special glass having an alumina content of 10% to 25%, such as TFT glass.

In the preferred practice, all of the mineral raw materials are blended into the stabilized beads of the "mass of stabilized beads" or "load". The fluxing agent, such as boric acid, is normally added at the melting facility. In an alternative process, the fluxing agent has been added to the stabilized beads. In another modification, not all of the raw materials are compounded into the stabilized bead. At least three of the mineral raw materials are processed into the stabilized bead and the customer adds final mineral raw materials and/or other components, such as a fluxing agent, during the melting process. These variations of the invention still uses the novel concept of forming beads with preferably ultra-fine particles of several mineral raw materials and then stabilizing the beads, preferably by partial sintering.

As an element of the invention, the powders in stabilized composite beads of the "mass of beads" have a maximum particle size limitation. Sometimes this maximum particle size is referred to as "controlled" which merely means it is intentionally accomplished; however, the term does not mean the powders are independently sized, even though in some embodiments they are "controlled" by a sizing procedure.

The method of the invention either grinds and sizes the raw material components of the beads before blending and forming the beads or the raw materials are mixed in a slurry with the pre-selected percentages and then wet milled as a slurry to reduce the size of the particles of all included raw material at the same time. When maximum particle size is used it generally refers to the D99 particle size; however, some sources define the "maximum particle size" of a powder as D99.9, or even D100.

This statement of invention defines the general technology utilized in making the novel bead for the charging load so the charging load has several advantages, such as lower energy costs and more rapid and smooth melting transformation, less bubbles and lower handling time and cost.

OBJECTS AND ADVANTAGES

The primary object of the present invention is an improvement in the existing process for making high alumina glass, such as thin film transistor glass for display devices. The improvement involves repackaging the raw materials used as a charging load for the melting process, without changing the capital equipment or modifying the equipment necessary for making the final product. The new charging load concept of the present invention allows many advantages, such as lower heat energy requirements, faster melting, and less entrained deleterious substances, such as air bubbles. Subsequently, the melting process is substantially less expensive as an overall cost even though making of the novel charging load may be somewhat more expensive.

Still a further object of the present invention is the provision of a novel charging load for making high quality glass which charging load is in distinct bodies, such as made by a spray dryer. The bodies are unique in that they have controlled maximum particle size for the particles of each mineral raw material. Furthermore, the bodies are formed into stabilized structures defined as stabilized beads so they retain their shape during transportation and handling in the heating process while drastically affecting the time and energy requirements of the transformation phases during the ultimate melting process converting the charging load into a final glass product.

A further aspect of the present invention is a modification in the TFT technology so that the capital equipment is not modified, but the charging load is modified to decrease the total heating cost, mixing procedure cost and melting time. By using the present invention, the charging load melts faster with less entrained bubbles such as are dragged into the process by loose raw material or raw material which has no structural integrity. Yet another object of the present invention is controlling the effective diameter of the novel beads constituting the basic aspect of the present invention. The effective diameters are adjusted by the spray dryer and may be further sized by either performing a top cut or a bottom cut of the stabilized beads.

Still a further object of the present invention is the provision of a novel charging load for making a glass, such as TFT glass, which expands the type of raw material that can be used to include alternative raw materials, such as aluminum trihydrate (ATH).

A further object of the present invention is the provision of the novel charging load constituting a mass of stabilized beads each formed from finely divided raw material powders having controlled maximum particle sizes, which beads are partially sintered to change essentially the silica into a partial amorphous condition and allows the flux (such as boron in the form of boric acid) to react with the beads so the fluxing of the charging load is better facilitated. Yet a further object of the present invention in making the novel stabilized beads by grinding, the raw materials to controlled maximum particle sizes so that the recovery rate for forming the particles in the raw material is higher.

Transformation and fusion in the melting process is enhanced by very small or fine particles, as used in the present invention. However, introduction of such fine particles into the melt has been avoided because the fine particles are easily airborne by internal currents. Small particles react separately and sometimes damage the furnace liner and cause many other problems during melting. Advantages obtained by use of fine, or preferably ultra-fine particles are realized because of the novel bead stabilization feature of the present invention. By stabilizing the beads, fine and preferably ultra-fine particles can be introduced into the melt without known problems of loose, very small particles. The individual beads, as units, are initially heated causing inter-particle fusion while the particles are held in intimate contact with each other. They are restrained from free unrestricted movement as individual fine particles. Consequently, the invention greatly improves the existing glass melting process.

These and other objects, aspects, features and advantages of the invention will become apparent to those skilled in the art upon a reading of the description of the invention, taken together with the accompanying drawings, which drawings are described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
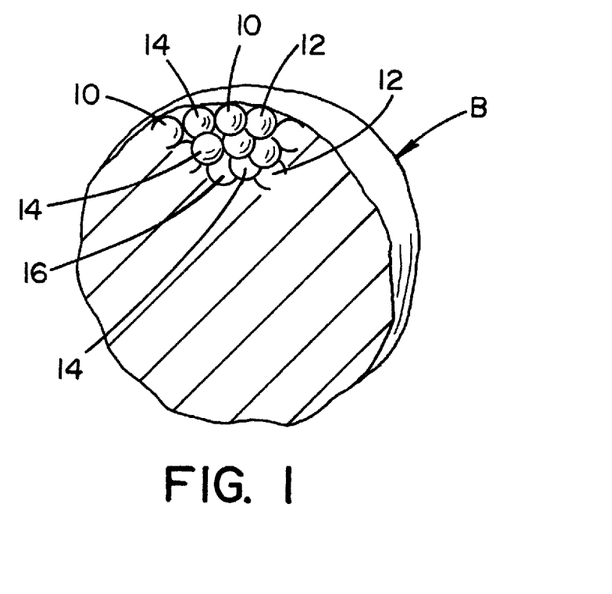
FIG. 1 is a cross-section pictorial view of a bead formed from mixed raw materials formed into fine or ultra-fine particles having a controlled maximum particle size.

Referring now to the drawings, wherein the showings are for the purpose of illustrating preferred embodiments of the invention only and not for the purpose of limiting the same. Bead B is formed from a plurality of sized small particles 10, 12, 14, and 16 which have been mixed in a slurry with the desired percentages necessary for making a particular, or "special," glass and then formed into the bead by a forming process, which is generally the use of a spray dryer. The outlet of the spray dryer is adjusted to the desired effective diameter of bead B, which is in the general range of 50-200 microns and can go as high as about 500 microns. A vast number of beads B are formed from a given slurry having the desired percentages of mineral raw material particles and particles sized to have a very small maximum size. Individual beads B are then partially sintered to create amorphous phase 20, illustrated schematically in FIG. 2. The amorphous phase holds together the various ultra-fine particles in partially sintered bead B, which ultra-fine particles are illustrated as particles P. They are generally silicon dioxide particles although other particles are held together by the amorphous phase. As will be described later, the amorphous phase is generally in the range of 20%-60% of bead B. After bead B in FIG. 1 is stabilized so it is non-friable, it is transported and handled at both the raw material supplier and at the melting facility. After being loaded into the melting furnace, heat is introduced into the mass of beads B constituting the raw material and the charging load for the heating process. In an alternative, the bead forms only most of the actual charging load.

Figure 3:
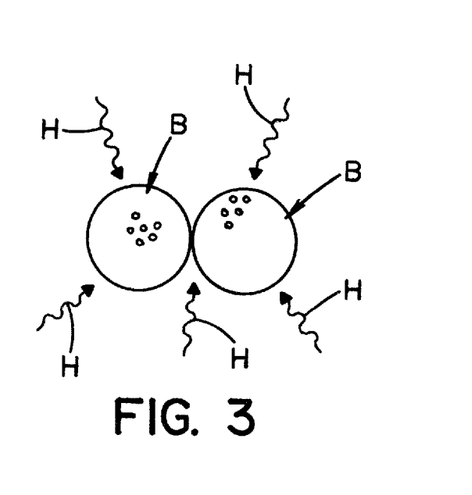
FIG. 3 is a schematic view of two individual beads as they are initially heated during the melting of the beads for producing a glass product.

In the initial heating, by employing the novel stabilized beads B, the heating first heats the beads containing ultra-fine particles in fixed intimate contact. After the stabilized beads are heated and at least partially melted, the heat creates the phase relationship between the raw material from all the beads into a final glass product. The process of initially heating the beads preparatory to melting and then fluxing the total mass of the charging load, is schematically illustrated in FIG. 3. Where heat input H is first absorbed by the beads to start melting and fusion. Then heat melts the total mass.

Figure 4:
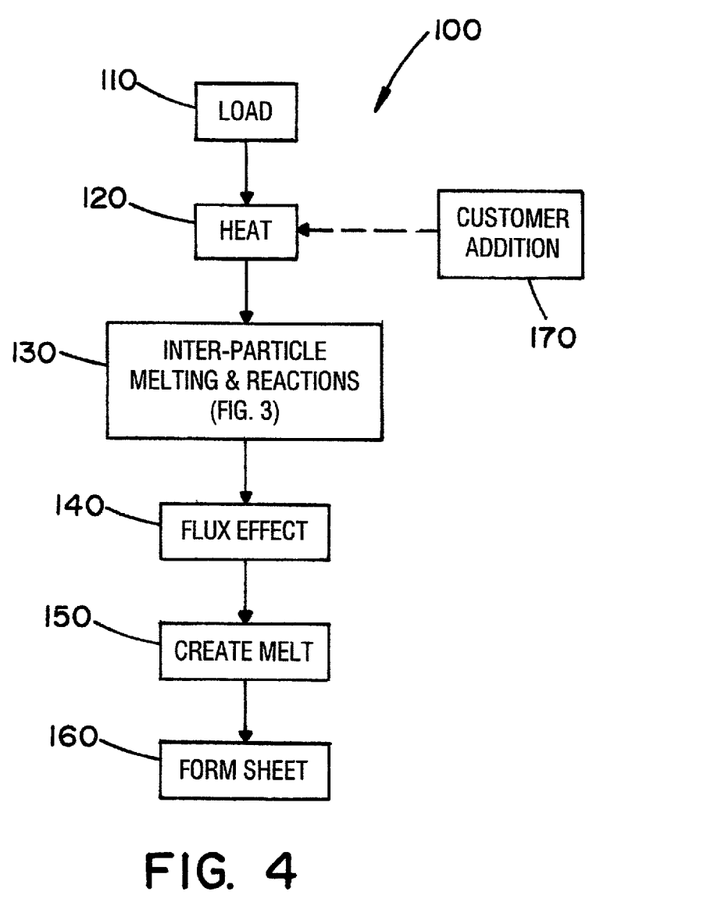
FIG. 4 is a block diagram of a common glass heating process utilizing the novel charging load of the present invention.

A mass of stabilized beads B constitutes a charging load for a standard heating procedure or process 100 as schematically illustrated in FIG. 4. The capital equipment and procedure is not effected by utilizing the present invention except to the extent that the total heat energy necessary and the melting time is reduced to drastically decrease the cost of melting process 100. Furthermore, a charging load comprising the novel stabilized beads B is easily handled, conveyed and processed without any regard for airborne dust, gases or other environmentally detrimental substances. The fine or ultra-fine particles are melted without becoming airborne. The beads in a mass are transported to the melting facility, as load 110 and are placed into the melting apparatus. The apparatus then heats the charging load as indicated by block 120. The heating process causes heating of the beads with the ultra-fine particles held together, as schematically illustrated in FIG. 3. This causes internal reaction and fusion of the raw materials preparatory to actual heating of the total melt. This melting procedure is illustrated as block 130. Interaction by the flux effect is indicated by block 140. Total melt 150 is formed into glass sheets, as illustrated by block 160. Process 100 is a standard heating process. The only difference is the use of the novel raw material beads of the present invention and the interaction of the heating process of the ultra-fine particles forming the beads, as schematically illustrated in FIG. 3 and represented by block 130 of FIG. 4. In some uses of the invention, beads B do not include all raw materials required in the melt of a special glass. At the manufacturing plant, a customer can use the novel mass of stabilized beads, but, also adds other raw materials, as is normally done for the fluxing agent. This slight modification is shown as operation 170 in FIG. 4.

Figure 5:
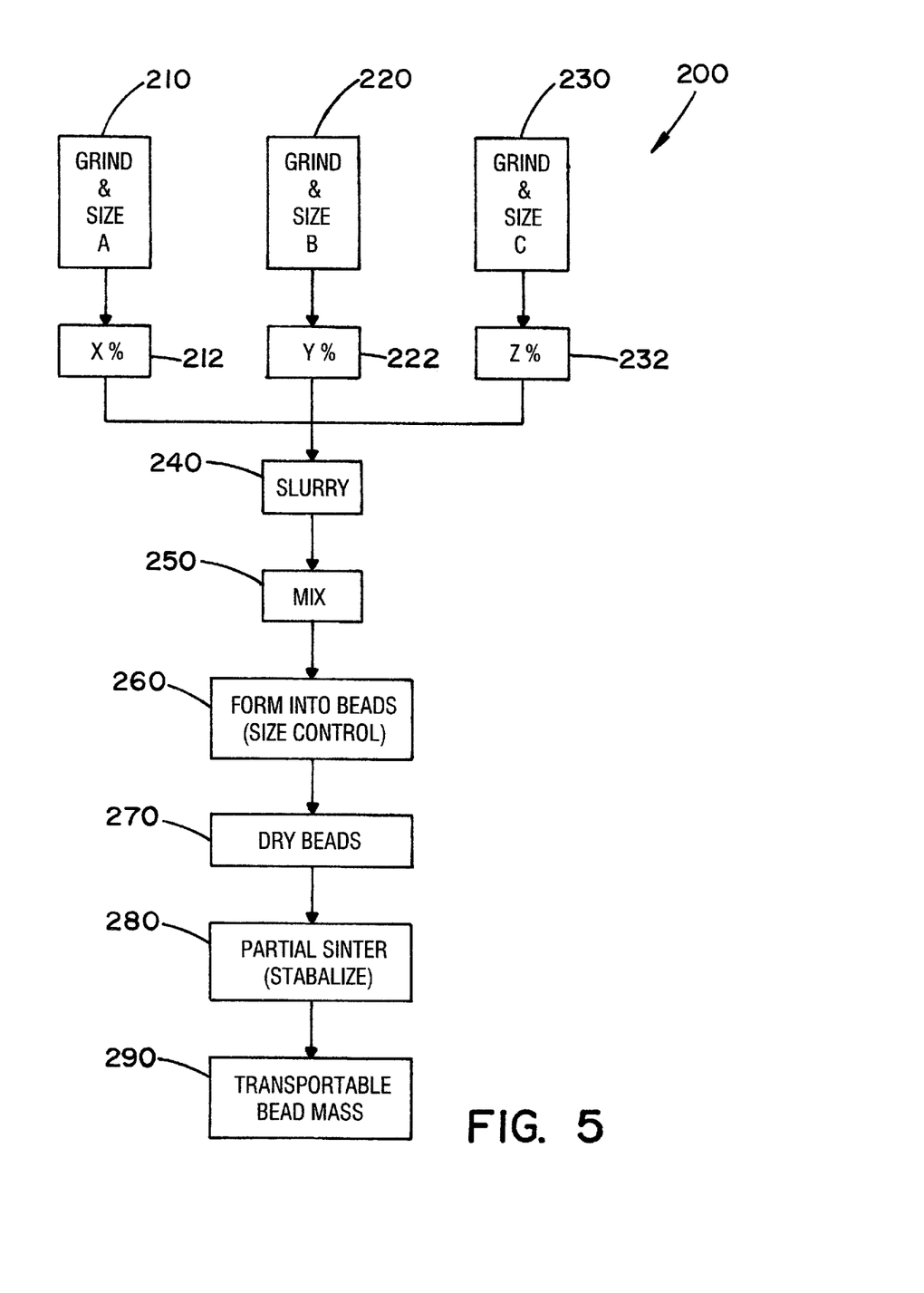
FIG. 5 is a block diagram illustrating a method of producing the novel charging load of the present invention.

Producing a novel charging load comprising a mass of stabilized beads containing fine or, preferably ultra-fine, particles can be accomplished by several procedures. One procedural operation used to make the charging load is generally illustrated as procedure 200 to be performed by the supplier of raw material for the glass industry. Procedure 200 is performed by the supplier and involves selecting the desired mineral raw materials, three of which are illustrated in FIG. 5. These raw materials 210, 220 and 230 are selected and ground into powders. The powders have a controlled maximum particle size of less than 30 microns. Indeed, the preferred embodiment includes a controlled maximum particle size D99 of less than 20 microns. In practice, the maximum particle size is controlled to a level range of 5-20 microns if the D99.9 size is used or 3-20 microns where the D99 size is used. This sizing operation is essential in the present invention because it has been discovered that the ultra-fine particle sizes substantially enhance the melting procedure and increase the recovery rate of the raw materials. In practice, the maximum particle size for each of the raw materials 210, 220, 230, etc., is in the range of 3 to 20 microns and are all essentially the same. However, the particle size of the individual raw materials could be different as long as they are within the size parameters defined above. When the fine or ultra-fine particles all have the same controlled maximum particle size, the raw materials in powder form can be mixed in the pre-selected percentage in a slurry or otherwise combined and then milled together by a wet or dry mill. In procedure 200 the raw materials are separately sized; but, that is not necessary in producing a stabilized bead with ultra-fine particles. Customers determine the percentage of the various raw materials to be used for a given melting process. These percentages of the various raw materials are used in steps 212, 222 and 232 so that the slurry device 240 receives raw materials in the desired or pre-selected percentages determined by the requirements for producing a given glass product. After the particles have been allocated in the desired percentages and formed into a slurry, they are thoroughly mixed as indicated by block 250. This operation is optional. Then, the slurry is formed into beads. This forming operation 260 is accomplished by a spray dryer which has an outlet adjusted to determine the general size or "effective diameter" of beads B formed from the mixture from block 250. Then the beads are dried beads, as indicated by block 270 and they are partially sintered, as indicated by block 280. Sintering is performed at a temperature drastically lower than the melting temperature used in the formation of the ultimate glass. In practice, this sintering temperature is in the general range of 900° C.-1200° C. and is performed for a short time such as 10 to 20 minutes. The amorphous phase 20 of beads B holds the beads together so that they can be handled easily and transported, as indicated by block 290. The transporting, handling and processing of the stabilized beads with broadly fine, but preferably ultra-fine particles constituting the novel charging load is one of many substantial attributes of the present invention.

Figure 6:
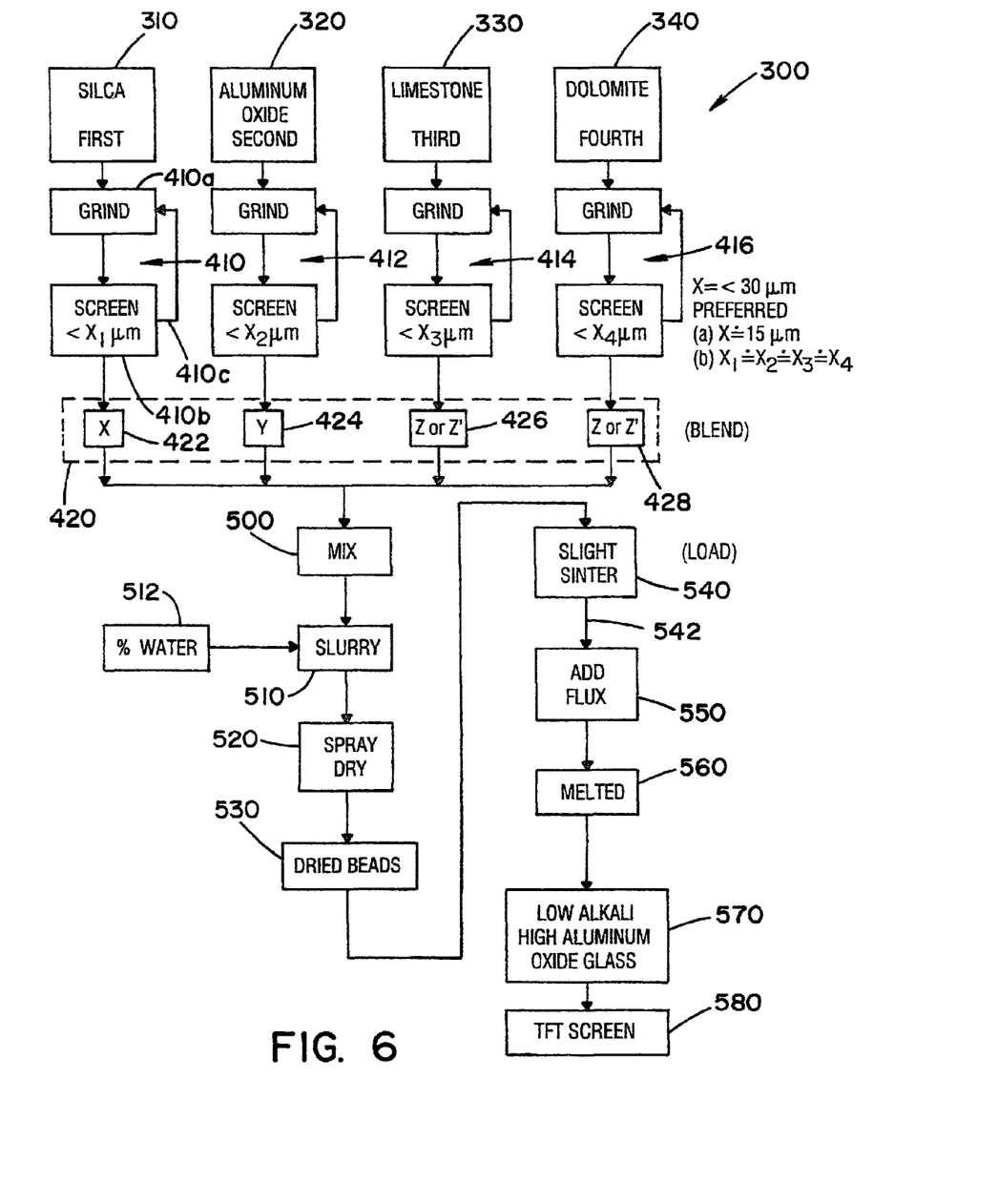
FIG. 6 is a block diagram of one embodiment of a method for making the novel charging load for a specific type of glass.

In a specific example of a glass including silica, aluminum oxide, limestone and dolomite, method 300 for producing the novel charging load of the present invention for such a glass is illustrated in FIG. 6. Silica 310 is mixed with aluminum oxide 320, limestone 330, and dolomite 340 to produce the raw material formula for a specific glass. The silica is ground and screened or sized as indicated by process step 410. Grinding process 410a produces a powder with a reduced particle size distribution (PSD) that is screened or classified by the classifier 410b. The classifier is set to a desired maximum particle size $X_1$, which is in the range of 3 to 20 microns. Larger particles are recirculated through line 410c back to grinding process 410a. This is standard practice and produces the fine or ultra-fine particles of the process. The recovery rate for controlling maximum particle size is quite high when compared with other particle sizing techniques. In like manner, aluminum oxide 320 is ground and sized by processing step 412 to produce a powder with a maximum particle size of less than $X_2$. The other two raw materials, limestone and dolomite, are ground and sized to a desired maximum particle size in the range of 3 to 20 microns, as indicated as steps 414 and 416. These sizes are $X_3$ and $X_4$, respectively. In practice, the particle sizes of the raw materials are essentially the same; however, that is not essential. As discussed with respect to procedure 200 in FIG. 5, method 300 involves a blending step 420, wherein the raw materials have a pre-selected percentages 422, 424, 426 and 428, respectively. These percentages X, Y, Z and/or Z' are the percentages necessary for producing the desired final glass product. Powders from blending process 420 are mixed, as indicated by block 500 and are then formed into a slurry at block 510, by the addition of water from source 512. The slurry, according to the standard practice, is spray dried at block 520 to produce beads B with fine or ultra-fine particles. Formation of the beads, is indicated in block 530, to have "effective diameters" of less than about 200 microns. This is one embodiment; however, diameters can be greater, such as less than 500 microns without departing from the intended spirit and scope of the present invention.

At this stage in method 300 beads are novel because they are bodies, i.e. beads, of fine or preferably ultra-fine particles with controlled maximum partial sizes, preferably a maximum particle size D99 of 3-20 microns. These beads would have the advantage of very fine particles; however, these beads would fracture if transported or handled by equipment. But, then would exhibit properties which have prevented even "small" particles, with their advantage, from being successfully used in a glass melting furnace. This inability to use small particles would not be changed by merely forming such particles into a mass.

The invention is completed by structurally stabilizing the fragile beads B by a partial sintering operation 540 corresponding to block 280 in FIG. 5. This novel step produces amorphous phase 20 in the beads with the remainder primarily crystallized silica and alumina particles. The invention is the output of operation 540, which produces stabilized beads that are transmitted to the glass making facility as indicated by line 542. At the ultimate glass making facility no changes in capital equipment are required, but the facility merely uses the charging load from partial sintering operation 540 to produce the desired glass. At the facility, flux is added, as indicated by block 550, and the charging load is melted, as previously described. This melting process of block 560 produces a low alkali, high aluminum oxide glass 570 which is suitable for TFT-LCD screen 580.

Figure 2:
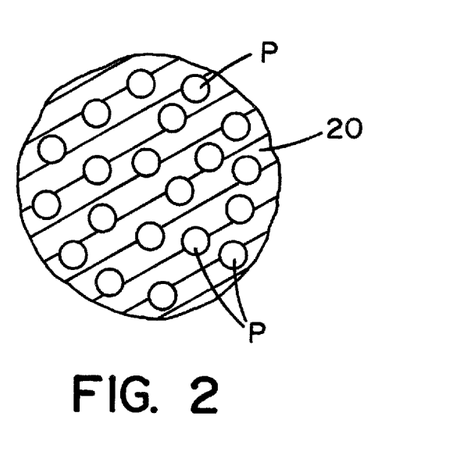
FIG. 2 is an enlarged cross-sectional view of the bead shown in FIG. 1 after it has been partially sintered to create an amorphous phase in the bead.

Procedure 200 and method 300 produce a novel beads B as shown in FIG. 1 and stabilized, as is shown in FIG. 2. The heating process at the glass making facility involves an initial heating of the beads, as shown in FIG. 3, and then overall melting of the load. The heating process is modified by the use of the novel stabilized beads constituting the raw material blend needed to make the required glass. The beads are first heated at lower temperature to produce partial fusion between the sized particles to produce 20-60% amorphous phase. Later, the beads are introduced into the glass forming melt itself to make the special glass.

Figure 7:
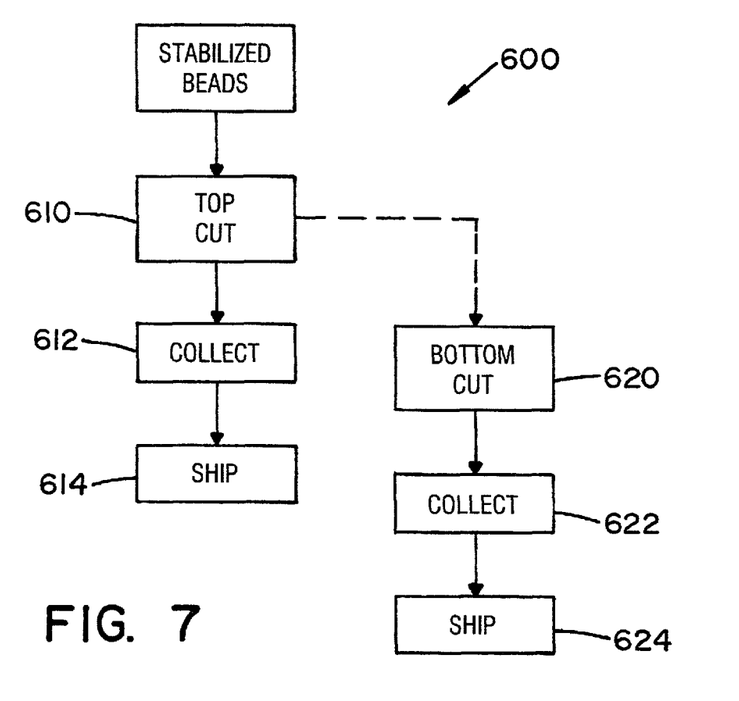
FIG. 7 is a block diagram showing a further modification of the present invention, wherein the effective diameters of the novel beads constituting the present invention are further modified to enhance the packing factor of the invention.
Figure 8:
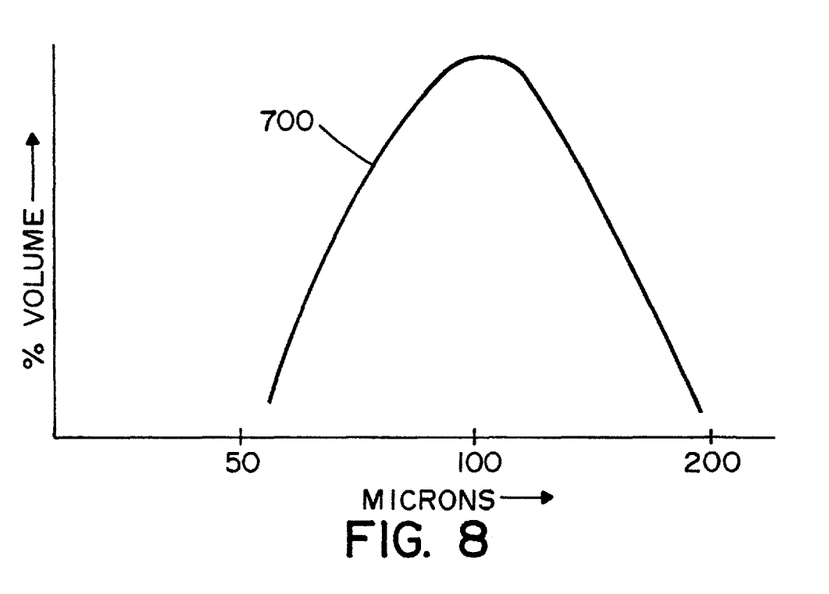
FIG. 8 is a graph of the effective diameters of the novel charging beads of the invention modified by the method disclosed in FIG. 7; and, FIG. 9 is a block diagram of an improved method for making the novel charging load of the present invention.

The effective diameters of the various beads B are determined by the output of the spray dryer and are generally in the range of 50-200 microns up to about 500 microns. In the preferred embodiment, the effective diameters are less than about 200-300 microns. The novel stabilized beads of the present invention can have their effective diameters modified to control the packing factor for the charging load. This additional operation modifies the beads of the charging load in a manner illustrated as method 600 in FIG. 7. After the novel beads have been stabilized, they are processed through a screen that makes the top cut, indicated at block 610. The stabilized beads are then collected as indicated by block 612 and shipped as indicated by block 614. In this manner, the novel stabilized beads can have controlled maximum effective diameters, such as 200 microns. In accordance with alternative concepts, bead with top cut 610 are subjected to a bottom cut 620 to eliminate any small stabilized beads, such as beads under 50 microns. In this manner, a desired total distribution size is collected at block 622 and shipped as indicated in block 624. Curve 700 in FIG. 8 represents a particle size distribution for the "effective diameters" of the stabilized beads collected at block 622. The beads have a controlled maximum effective diameter and a controlled minimum effective diameter.

In summary, the invention involves a charging load formed from a mass of stabilized beads each of which is formed with the desired formula for the finished glass in the form of ultra-fine powders each having a controlled maximum particle size D99. Use of fine particles having a maximum particle size D99 slightly larger than the ultra-fine size of 20 microns, such as about 30 microns, is within the scope of the invention. Merely forming beads of the necessary mineral raw materials, does not accomplish advantages and objectives realized by the discovery constituting the present invention, as described herein.

EXAMPLE

A comparative melting test was done with a typical TFT glass composition between conventional batch material preparation and the implementation of this invention. The TFT finished glass chemistry is shown in Table 1.

TABLE 1

| Item | Unit | $SiO_2$ | $Al_2O_3$ | $B_2O_3$ | CaO | MgO |
|---|---|---|---|---|---|---|
| TFT glass | wt % | 60 | 17 | 11 | 9 | 3 |

The glass batch formulation is shown in Table 2 with the proportion of each individual component, along with the conventional sizing and chemical composition.

TABLE 2

| Item | Unit | Silica | Aluminum | Boric acid | Dolomite | Limestone |
|---|---|---|---|---|---|---|
| Composition | wt % | 60.10 | 16.98 | 19.54 | 16.61 | 6.34 |
| +30 mesh | wt % | 0.00 | 0.00 | — | 6.34 | 0.00 |
| +120 mesh | wt % | 0.00 | 6.29 | — | 83.66 | 81.80 |
| +200 mesh | wt % | 6.48 | 59.61 | — | 5.70 | 9.20 |
| +325 Mesh | wt % | 58.73 | 27.20 | — | 1.16 | 5.40 |
| −325 Mesh | wt % | 32.79 | 6.90 | — | 3.14 | 3.6 |
| $SiO_2$ | wt % | 99.850 | 0.0200 | — | — | 0.2600 |
| $Al_2O_3$ | wt % | 0.0634 | 99.600 | — | 0.0083 | 0.0065 |
| CaO | wt % | 0.0023 | — | — | 32.8000 | 55.190 |
| MgO | wt % | 0.0018 | — | — | 19.8200 | 1.0100 |
| $Fe_2O_3$ | wt % | 0.0114 | 0.0200 | — | 0.0350 | 0.0127 |

A composition of the formulation prepared in the conventional fashion was made and a comparative composition of the same formulation was made by blending the silica, aluminum oxide, dolomite, and limestone together after milling each component to a controlled maximum particle size D100 (D99.9) of 15 microns. This finer blended composition with ultra-fine particles was slurried to a homogeneous suspension in water, spray dried and partially sintered at 1200° C. for 10 minutes. The stabilized partially sintered beads were mixed with the appropriate proportion of boric acid to complete the formulation so that both compositions consisted of the same raw material blend.

The two formulations were put into a gradient furnace to evaluate when melting occurred to compare the thermal performance between the two different forms. The results of this comparative test show a higher degree of melting and reaction for the invention at the same and lower temperatures for the two examples. Consequently, it is more energy efficient and more cost efficient overall when making a specialty glass for the manufacturing markets. The low surface area partially sintered beads are beneficial for health and safety as it is a dust-free form and eliminates risk of crystalline silica inhalation, along with a nuisance dust inhalation of other mineral components. The low surface area of the individual particles making up the beads of the invention decreases air entrapment during the introduction of a batch into the furnace. This lowers the gas bubble refinement in the furnace and thereby reduces both finished glass defects and energy input. There is less residence time in the furnace for refining the new charging load over the existing charging load. Thus, the invention repackages the normal batch for making glass with finer grained, more thermally efficient, safer agglomerated beads that ensure better homogenous melting. Safe handling, less energy requirements by the manufacturer, elimination of segregating melting in the furnace, potential higher furnace capacity due to faster melting and reduced refining time are all advantages realized by the charging load invention described herein.

Further Examples

After establishing the advantages of the present invention assertion further examples were formulated of the novel stabilized beads used to create a charging load for TFT glass. The raw material batch was measured to have the oxide weight percentages illustrated in Table 3.

TABLE 3

| XRF Results(%): | |
|---|---|
| $SiO_2$ | 66.48 |
| $Al_2O_3$ | 19.51 |
| MgO | 4.12 |
| CaO | 9.83 |
| $Fe_3O_3$ | 0.01 |
| $TiO_2$ | 0.02 |
| $K_2O$ | 0.03 |
| $Na_2O$ | 0.00 |
| Sum | 100.00 |

This raw material mixture was ground and sized with a maximum targeted D99 particle size of 15 microns or 7 microns. After the beads were formed with ultra-fine particles, as shown in FIG. 1, they were partially sintered with a low temperature of 930° C.-1140° C. for either 10 minutes or 20 minutes. The composition of the stabilized beads for the 7 micron and 15 micron examples with the different temperatures and times are illustrated in Table 4.

TABLE 4

| | Mineralogy(%): | | | | | | | |
|---|---|---|---|---|---|---|---|---|
| | TFT-AL15 T1140M10 | TFT-AL15 T1140M20 | TFT-AL15 T1030M10 | TFT-AL15 T1030M20 | TFT-AL07 T1030M10 | TFT-AL07 T1030M20 | TFT-AL07 T930M10 | TFT-AL07 T930M20 |
| quartz $SiO_2$ | 26.3 | 22.3 | 32.6 | 30.4 | 28.8 | 27.5 | 29.6 | 28.5 |
| corundum $Al_2O_3$ | 17.0 | 17.0 | 17.0 | 17.0 | 17.0 | 17.0 | 17.0 | 17.0 |
| diopside $CaMg[Si_2O_6]$ | 6.0 | 7.0 | 2.0 | 2.0 | 4.0 | 4.0 | 1.5 | 2.0 |

TABLE 4-continued

| | Mineralogy(%): | | | | | | | |
|---|---|---|---|---|---|---|---|---|
| | TFT-AL15 T1140M10 | TFT-AL15 T1140M20 | TFT-AL15 T1030M10 | TFT-AL15 T1030M20 | TFT-AL07 T1030M10 | TFT-AL07 T1030M20 | TFT-AL07 T930M10 | TFT-AL07 T930M20 |
| akermanite $Ca_2Mg[Si_2O_7]$ | 1.0 | — | 2.5 | 2.0 | 1.5 | 1.5 | — | — |
| anorthite $CaAl_2Si_2O_6$ | 2.0 | 2.0 | — | — | — | — | — | — |
| amorphous content | 47.0 | 51.0 | 45.0 | 48.0 | 48.0 | 50.0 | 51.0 | 52.0 |
| Sum | 99.3 | 99.3 | 99.1 | 99.4 | 99.3 | 100.0 | 99.1 | 99.5 |

The amorphous content increased with time in the partial sintering of the beads. Most of the amorphous content was caused by the interaction of the limestone and dolomite with the crystalline quartz composition of the raw materials. The reduced maximum particle size also resulted in higher amorphous phase content at lower sintering temperatures. Above 930° C. diopside starts to appear. At 1140° C., anorthite starts to form indicating formation with both silica and alumina. All of these samples have the advantages of lower energy costs and reduced handling expenses at the glass manufacturing facility.

Further Discovered Advantages

After the invention involving repackaging the charging load for a TFT glass process, by controlling the maximum particle sizes of the raw material powders and by stabilizing the resulting bead or body, further advantages beyond energy costs, handling costs, and melting efficiency, were discovered. Beads containing ultra-fine particles are more reactive to thermal input and are capable of retaining more intimate proximity during the melting process. This is a distinct advantage. Utilizing ultra-fine powders, the more reactive materials, like silica, are fluxed by other materials like carbonates. The overall effect is higher efficiency of applied energy for lower manufacturing costs of the glass due to lower overall energy consumption by the much more efficient form of the batch materials. Thus, the novel use of controlled small particle sizes having a maximum particle size D99 in the general range of 3-20 microns, and even to about 30 microns, presents significant advantage in the overall use of the invention. "Controlling" the maximum particle size can be performed by grinding and sizing, as shown in FIGS. 5 and 6 or merely by grinding for a selected time and speed, either dry or preferably wet as used in FIG. 9.

The use of ultra-fine powders in the stabilized bead has resulted in a further advantage. Customers demand certain particle sizes of raw materials, such as silica, limestone, and dolomite, which can result in low recovery rates in producing the desired raw material powders for the customer. It has been found that in processing the raw materials for customer specifications, the recovery rate may be about 80% for the carbonates and about 55% for the silica. Consequently, the raw material manufacturer loses substantial raw material and has higher costs in producing the charging load for customers manufacturing TFT glass. The fine grinding aspect of this invention has resulted in a recovery rates significantly higher. This results in another efficiency improvement in processing the raw materials.

It has been found that the amorphous content of the partially sintered beads is a process indicator to determine the cost effective balance between energy and stability. It has been found that the processing costs for the invention can be reduced by more grinding and less sintering. However, both of these concepts are necessary for the implementation of the present invention. It has been found that the smaller the particles the more explicit fusion between the particles during melting. Consequently, even though particles with a controlled maximum particle size D99 as high as about 30 microns can be used in the invention, ultra-fine particles with a maximum particle size D99 in the range of 3-20 microns, which size limitation is preferred.

Realizing the above discovered advantages of a new charging load for existing TFT processing facilities, there is reduced heating costs, ease of handling, better fusion, reduced time and more efficient use of the raw materials. This all results from the ultra-fine particles in the bead and the amorphous phase stabilizing the bead for subsequent handling, transportation, etc. Thus, the invention is not a new TFT technology, but merely an improved TFT process utilizing existing equipment of the glass producer. The ultra-fine particles provide better fusion because tighter contact between multiple regions or raw materials that are closely positioned and held within the stabilized beads.

It has also been discovered that since the individual beads are initially transformed by fusion, the fluxing procedure for the melt is rendered easier by the invention.

Provisional Application

The parent provisional application has been incorporated by reference herein; however, certain concepts therein are hereinafter disclosed.

Conventional glass manufacturing, not necessarily TFT glass, involves mixing and melting techniques and problems generally discussed in the introductory comments of Carty U.S. Pat. No. 7,937,969 (incorporated by reference herein). A conventional melting process is disclosed in FIGS. 1 and 2. Carty attempts to solve the problems associated with the conventional glassmaking techniques by controlling reactive paths involved in the melting process. Such techniques do not relate to making of a "special glass" which is the art contemplated by the present invention. Nor does Carty suggest any process similar to the novel concepts of the present invention and is disclosed as background technology.

The outer surface of the stabilized beads is quite smooth. This "smoothness" may be defined as a roundness greater than 0.8. In other words, the partially sintered beads which are heated to a temperature drastically below the processing temperature for the ultimate glass are not jagged, but are smooth. "Non-friable" as used herein means that the beads are structurally stable enough to withstand normal handling and mixing encountered with a glass manufacturing process. They are not rigid enough to withstand "hammer action." Such condition or stability is created by the amorphous content of the partially sintered beads. The term "screening" or "screen" is generic and includes any process or processes that generate particles having a particular maximum particle size and/or range of particle sizes. Sizing is not limited to air classifiers. The sizing can be on individual powders or on blended powders. This provides a given size for all raw materials. The term "special glass" is glass used for TFT glass, flat glasses, LCD glass, and other technical display glasses. The invention increases and/or improves the reactions occurring during the melting process. The novel beads are smooth and have less surface area than prior art charging loads or "batches." The invention increases thermal efficiency, gives more internal reaction surface area, creates less entrapped air and promotes homogenization of raw material during the melting process. The low surface area of the novel beads decreases air entrapment during introduction of the "batch" or "charging load" into the furnace, lowers the gas bubble refinement time in the furnace, improving both finished glass defects and energy efficiency.

The preferred embodiment of the invention is forming the composite bead by slurry and spray drying. However, the novel bead can be formed by agglomerating or pelletizing the "blend" in other known procedures. The novel beads are the first aspect of the invention, no matter how they are produced. But, the method of producing the stabilized beads is a novel development in the glass industry. Furthermore, the invention is an improvement in making TFL glass, which improvement does not involve changing the current equipment of a glass making facility.

As a broad claimed concept, several mineral raw materials needed for the charging load or batch of a specific glass are ground into fine particles and blended together in a slurry in proportion to the recipe for the desired glass. Such slurry is formed into beads that are partially sintered so they can hold together for transportation to and introduction into a glass melter.

Improved Method 1000

In the original method of making the novel mass of stabilized beads, as described in FIGS. 5 and 6, the various raw materials in the composite bead were ground and sized to a maximum particle size of less than 30 microns and preferably to a D99 size in the range of 3 to 20 microns. These ground and sized particles were then slurried, form into beads and partially sintered. The mineral raw materials that were ground and sized preferably included all of the raw materials subsequently used with fluxing agent in the melting process for the special glass. As previously discussed, in a modification of the invention, less than all of the mineral raw materials are used in the novel stabilized beads. After originally completing the invention relating to the stabilized beads, a secondary invention was made. The inventors discovered and developed method 1000 shown in FIG. 9. In this method invention, the mineral raw materials, at least three, but preferably all raw materials that are necessary for making the special aluminosilicate glass, are provided in coarse form. They are combined in the desired percentages of the raw materials in the "final" melt to make the special glass. This blending mixture of "provided" raw materials is then formed into an input slurry which is wet milled or ground to size all of the raw material particles at the same time in the same milling or grinding equipment. This common grinding process is a wet ball mill, but any other appropriate and known grinding mechanism can be used for reducing the size of the provided raw material particles to the desired and novel particle size of the original invention. This particle size is either a "fine" particle size of less than 30 microns or, preferably, an "ultra-fine" particle size wherein the maximum particle size D99 is in the range of 3 to 20 microns. This grinding or milling process performed on the input slurry of all of the "provided" raw materials creates a milled slurry. The milled slurry is formed into the mass of beads, preferably by a spray dryer, which is then partially sintered to stabilize the beads.

Figure 9:
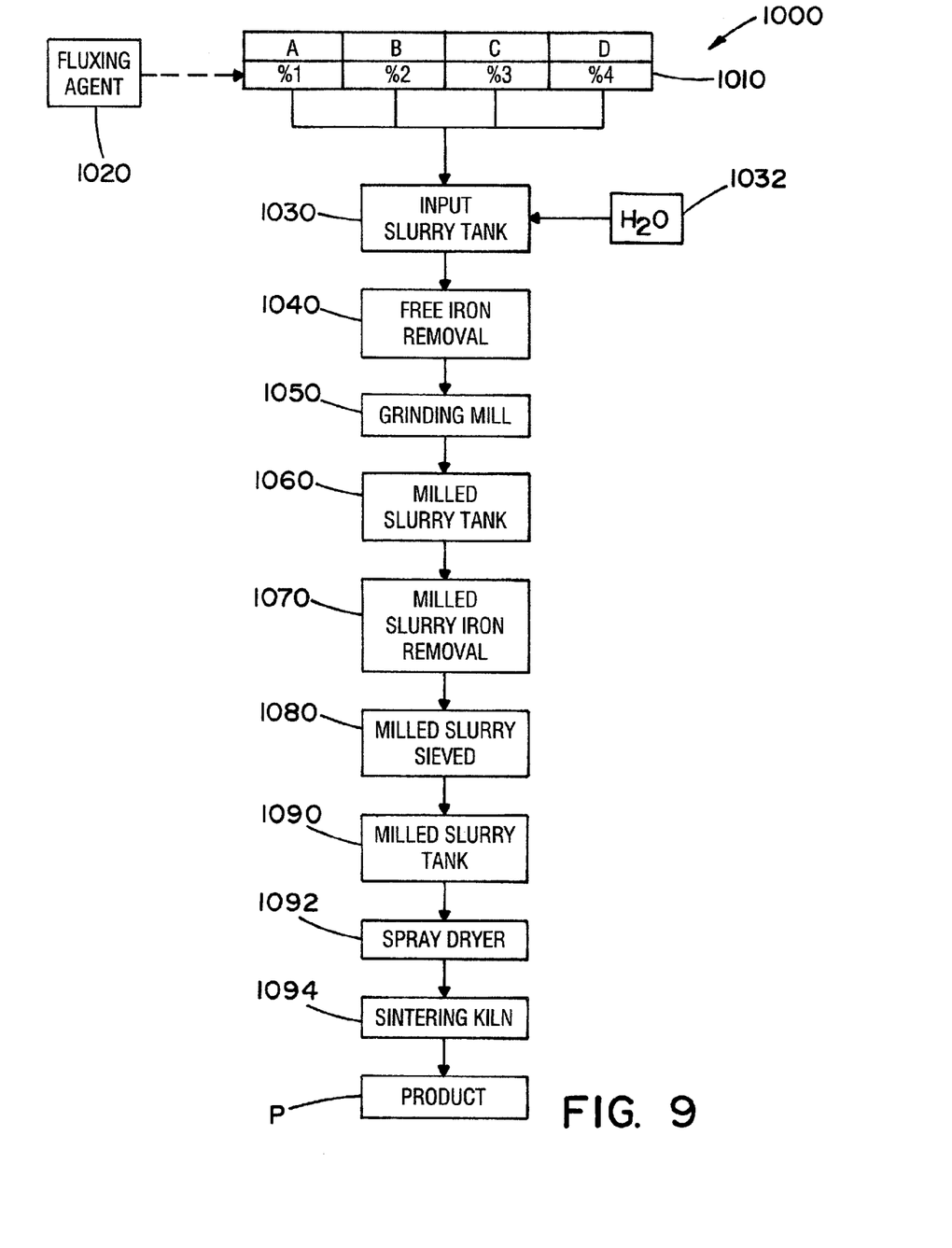

Details of method 1000 are schematically disclosed in the diagram of FIG. 9. Of course, certain modifications can be made in this novel method of making the novel stabilized, composite beads used by a customer to create an aluminosilicate glass product. The ultimate glass product contains several raw materials having pre-selected percentages and melted with a fluxing agent.

In the broadest aspect of the present method invention, method 1000 involves the operations of providing at least three of the several raw materials, as coarse particles. The composite bead includes some or all of the raw materials used in the melting operation. The particular raw materials are then measured out in the pre-selected weight percentages necessary for the final melting process. The weight percentages of the final melt determines the weight amounts of the input raw materials. The selected raw materials are then blended into a composite mixture having the pre-selected weight percentages as necessary for the final melting process. The "provided" raw materials to be used in the particular bead being manufactured are then combined with a liquid to produce an "input" slurry of the blended, provided coarse raw materials. By an appropriate milling device, such as a wet ball mill, the input slurry is milled to reduce the coarse raw materials into fine particles with a maximum particle size of less than 30 microns thereby creating a "milled" slurry of fine particles so the milled slurry can be formed into a mass of individual beads. Each bead contains the necessary raw materials in their pre-selected weight percentages. In this matter, a novel composite bead of the desired raw materials for the final melting process is produced. The beads in the mass of beads are then structurally stabilized to produce the inventive concept of a mass of stabilized beads, as previously described in this application. This processing procedure for the novel beads defines the broad statement of invention of method 1000. However, the disclosed actual method involves further secondary aspects including forming the mass of beads, irrespective of the composition, by a spray dryer.

Improved method 1000 incorporates operations for magnetically removing iron particles from both the input and milled slurries. Such iron removal can be performed on the slurry created in the methods disclosed in FIGS. 5 and 6. Removal of iron particles from the raw materials lowers the iron content in the final melted glass and increases the transmission of the finished glass product. Iron oxide reduces the transmission levels in such glass; therefore, removal of iron particles in the form of oxide or otherwise is very beneficial in the process of making the novel beads of the present invention. Higher transmission glasses for display products is quite beneficial for obvious reasons, but also can enable lower light intensity (display) which can help in improving battery life. In method 1000, the removal of iron particles, primarily oxides, magnetically is performed on slurries. In current iron removal operations, magnetic separation is normally performed on dry particle masses prior to milling. After milling the particles are converted into the particle size, the rare earth roll (RER) magnetic separators do not work effectively on such fine powders. The formation of two slurries in method 1000 enables a second level of magnetic separation, not heretofore available in a practical or effective way in normal and conventional TFT raw material processing. In summary, in producing raw materials for the special glasses of the present invention, magnetic separation is normally performed on dry powder, which allowed magnetic separation only before the powder is formed into the fine particle sizes. Method 1000 disclosed in FIG. 9 allows free iron removal operation in the slurry prior to the grinding mill and in the slurry after milling of the particles has been accomplished. In this manner, the iron removal can reduce the iron content of the ultra-fine particles, not just larger particles. The benefit of allowing the iron removal procedure in a wet procedure after the milling is that various forms of iron oxide can be removed easily even though the particles are fine or ultra-fine. After milling, there is also likely to be more free iron content in the raw materials. Magnetic particles are liberated from the feed stock involving several raw materials during the milling process itself Individual particles as well as any possible contaminations created during the processing of the input slurries can be removed by using the process operations disclosed and employed in method 1000. In summary, another aspect of the present invention is the removal of iron particles from the raw materials slurry after the raw materials have been converted by milling into ultra-fine particles. This has not been possible in other processing of raw materials for use in the special glass industry. Iron removal operations on slurried ultra-fine particles can be employed in process 200 in FIG. 5 and method 300 in FIG. 6. After the ultra-fine raw material particles are slurried preparatory to be formed into the beads, a magnetic iron removal operation is used to obtain the advantages explained herein.

As in the previously disclosed methods of making the inventive beads, method 1000 preferably grinds the raw materials into a maximum particle size D99 in the range of 3 to 20 microns. The "provided" coarse raw materials for the beads to be manufactured by method 1000 are, preferably, all of the raw materials used in the ultimate melting process for making the aluminosilicate special glass. Furthermore, as disclosed in FIG. 9, even though the fluxing agent is normally introduced by the customer at the melting process, it can be incorporated into the novel beads of the present invention. Thus, the novel beads in the desired weight levels to give the raw material percentages for the "final" melting process can include some or all of the final raw materials. Furthermore, method 1000 can introduce the fluxing agent, such as boric acid, into the blend of selected or "provided" raw materials. Method 1000 is used for making the beads constituting the charging load or batch for making a TFT sheet product. Preferably, all raw materials are used with the pre-selected percentages or these percentages are used to determine the weights of less than all of the raw materials for reasons previously discussed.

Method 1000 is performed for making stabilized beads used in a glass product, which includes raw materials A, B, C and D. Common examples of these raw materials have been previously identified. Each of the raw materials is provided in a coarse condition where the particles can be large as 600 microns. In the final melting process, raw material A is used in the final product with percentage 1, raw material B is used at percentage 2, raw material C is used at percentage 3 and raw material D is used at percentage 4. These coarse grained raw materials are selected at the necessary weight percentages based upon the final melt percentages. Operation 1010 blends all or the selected number of raw materials for the composite beads being manufactured. Preferably, all of the raw materials are incorporated in the beads, although the method accommodates a consumer who prefers adding its own special raw material for the final melting process. In blending process 1010, as an optional feature, fluxing agent 1020 is also blended with the provided raw materials for the final bead compound. After the blending operation, an "input" slurry 1030 is formed in accordance with standard practice in a slurry tank by adding water 1032 to the selected and weighted raw materials. This input slurry has a blend of the selected coarse raw materials with or without fluxing agent 1020. A magnetic iron separation or removal process 1040 is performed to remove iron oxides and other magnetic particles or materials from the input slurry. Thereafter, the input slurry is wet milled or ground by a standard device, such as a wet ball mill, at operation 1050. The milled slurry is stored in tank 1060. This is similar to tank 1030 and includes a motorized stirring operation so that the slurry is retained in its fully mixed and homogeneous form. From slurry tank 1060, the milled slurry is passed through a second magnetic iron removal mechanism 1070. This is a novel operation since the magnetic separation is performed on the milled slurry which is formed of particles having a maximum particle size of less than 30 microns and, preferably, in the range of 3 to 20 microns. Iron removal from fine particles could not be done in other systems for processing raw materials to be sent from the supplier to the customer.

As an optional operation, the milled slurry is passed through a device 1080 to remove any casual larger particles or bodies that inadvertently survived the slurry processing to this location in method 1000. Such "sieving" operation is merely a procedure for assuring that there are no larger particles that have accumulated in the milled slurry stored in tank 1090. From tank 1090, the milled slurry with the controlled particle size raw materials and/or fluxing agent is formed into a mass of individual beads by spray dryer 1092, which device performs the bead forming function as described in relationship to the methods in FIGS. 5 and 6. This mass of composite beads is then partially sintered in kiln 1094 to produce the desired product P. Method 1000 is a new development for making the novel product. Various modifications to this method can be made to practice the broad aspect of the invention described in the above statement of invention.

The new stabilized beads defined in the claims of this application have been made by different methods; however, such processing advancements have resulted in the invention of method 1000. This method has the broad aspects of blending the weight percentages of the selected raw materials in "coarse" form, making an "input" slurry, grinding the input slurry into a "milled" slurry where the raw materials have a controlled maximum particle size of less than 30 microns and, preferably, a D99 particle size in the range of 3-20 microns. The milled slurry is then formed into a mass of individual composite beads, which are partially sintered to form a mass of structurally stabilized composite beads having the described characteristics. Other aspects of method 1000 are improvements to this basic method concept and also constitute novel developments in this particular industry.

CONCLUSION

The melting procedure for making TFT glass is improved by a newly discovered charging load concept wherein a mass of stabilized beads are produced by finely dividing the mineral raw materials of the charging load into particles having a controlled maximum particle size and then forming beads of such particles. These beads are heated to create an amorphous phase causing the beads to be stabilized for subsequent transportation and handling. The scope and bounds of the invention are set forth in the attached claims which are incorporated by reference in this description as further disclosed.

While considerable emphasis has been placed on the preferred embodiments of the invention illustrated and described herein, it will be appreciated that other embodiments thereof, can be made. Many changes can be made in the disclosed preferred embodiments without departing from the invention. Furthermore, the embodiments described above can be combined to form yet other embodiments of the invention. Accordingly, it is to be understood that the foregoing descriptive matter is to be interpreted merely as illustrative of the invention and not as a limitation to the invention.

It is claimed:

1. A charging load comprising at least three diverse mineral raw materials in pre-selected percentages, said charging load being transformable into a melted special glass by heating to a temperature of at least 1,200 C. and being a mass of structurally stabilized individual beads, where each of said beads is a composite of said at least three diverse mineral raw materials made non-friable by a partial sintering process with an amorphous content in the range of 20-60 mass percent, each bead of said mass containing a homogeneous mixture of said at least three diverse mineral raw materials comprising particles, where said particles are mixed in each of said beads at said pre-selected percentages.

2. The charging load, as defined in claim 1, wherein said particles have a maximum size of less than 30 microns.

3. The charging load as defined in claim 1 wherein said glass is an aluminosilicate glass.

4. The charging load as defined in claim 2 having a maximum D99 particle size in the range of 3-20 microns.

5. The charging load as defined in claim 1 wherein each of said beads have an effective diameter with a controlled maximum value.

6. The charging load as defined in claim 1 wherein each of said beads have an effective diameter with a controlled minimum value.

7. The charging load as defined in claim 1 wherein said glass product is TFT glass.

8. A method of making a mass of stabilized beads including at least three mineral raw materials used in pre-selected percentages in a charging load, said charging load being for use in a melting process to make a melted special glass, said method comprising:
(a) creating a slurry containing said at least three raw materials in powdered form and in said preselected percentages, with said raw materials each having a maximum particle size D99 less than 30 microns;
(b) forming said slurry into a mass of individual beads where each bead contains said at least three raw materials in said pre-selected percentage and particles of said at least three raw materials have said maximum particle size; and,
(c) stabilizing each bead of said mass by a partial sintering process so each bead is structurally stable with an amorphous content in the range of 20-60 mass percent for subsequent handling as a mass of stabilized beads.

9. The method as defined in claim 8 including a procedure of sizing said raw materials into said maximum particle size is performed before creating said slurry.

10. The method as defined in claim 8 wherein said stabilized bead of said mass each has an effective diameter of less than 500 microns.

11. The method as defined in claim 8 wherein said stabilized beads each includes all of the mineral raw materials for said charging load.

12. The method as defined in claim 8 including magnetically removing iron from said slurry before said forming operation.

13. A mass of structurally stabilized composite beads to be melted into a special glass product comprised of at least three diverse mineral raw materials in pre-selected percentages, said at least three mineral raw materials constituting the charging load for said special glass, each of said stabilized beads containing a homogeneous mixture of ground particles of said at least three of said diverse mineral raw materials and having an amorphous content in the range of 20-60 mass percent, wherein said particles of said at least three diverse mineral raw materials have a maximum particle size of less than 30 microns and the percentages of said at least three diverse mineral raw materials in each of said stabilized beads is said pre-selected percentages for said at least three diverse mineral raw materials.

14. The mass of stabilized beads as defined in claim 13 wherein said at least three raw materials is three mineral raw materials.

15. The mass of stabilized beads as defined in claim 13 wherein each of said stabilized beads contains a fluxing agent for making said special glass product.

16. The mass of stabilized beads as defined in claim 13 wherein said stabilized beads have an alumina content in the range of 10-25 percent.

17. The mass of stabilized beads as defined in claim 13 for making TFT glass.

18. A Method of making stabilized, composite beads used to create a special glass product containing at least three mineral raw materials in pre-selected weight percentages to be melted with a fluxing agent to produce said glass product, said method comprising:
(a) providing said at least three mineral raw materials in particle form;
(b) blending said provided raw materials in said pre-selected percentages;
(c) making an input slurry of said blended raw materials;
(d) milling said input slurry to reduce the particle size of said blended raw materials into particles having a maximum particle size of less than 30 microns thereby creating a milled slurry of said provided raw materials having said reduced particle size particles;
(e) forming said milled slurry into a mass of individual beads, where each bead contains said provided raw materials with said milled reduced particle size particles; and,
(f) partially sintering said beads so each of said beads have an amorphous content in the range of 20-60 mass percent.

19. The method as defined in claim 18 including magnetically removing iron particles from said slurry before said mass forming operation.

20. The method as defined in claim 18 wherein the provided mineral raw material includes all of the raw materials to make the charging load for said glass product.

21. The method as defined in claim 18 including adding a fluxing agent into said input slurry so said individual beads of said mass of beads includes a fluxing agent.

22. The method defined in claim 18 wherein said glass product is an aluminosilicate glass product.

* * * * *